FIG. 1

May 23, 1950 E. C. KASTNER 2,508,522
METHOD AND APPARATUS FOR STRIPPING
ARTICLES FROM MOLDS
Filed March 30, 1946 6 Sheets-Sheet 2

INVENTOR.
EDWARD C. KASTNER
BY
Bates, Teare, + McBean
ATTORNEYS

INVENTOR.
EDWARD C. KASTNER
BY Bates, Teare, & McBean
ATTORNEYS

Patented May 23, 1950

2,508,522

UNITED STATES PATENT OFFICE 2,508,522

METHOD AND APPARATUS FOR STRIPPING ARTICLES FROM MOLDS

Edward C. Kastner, Akron, Ohio, assignor to Akron Standard Mold Company, Akron, Ohio, a corporation of Ohio Application March 30, 1946, Serial No. 658,499

9 Claims. (Cl. 18—2)

This invention relates to the stripping of articles from separable molds and more particularly to the stripping of rubber articles such as balls from vulcanizing molds.

The invention is in the nature of an improvement over that disclosed in Letters Patent 2,365,764 entitled "Method and apparatus for stripping articles from molds" and issued to me on December 26, 1944. The present invention follows the general method there set forth for stripping articles from molds by producing a circular translation of one of the mold members relative to the other. In both cases, the molded or vulcanized article is cramped across a diameter, due to the relative approach of a part of one mold cavity and the opposite part of the other cavity, whereby two opposite regions of the article are separated from their corresponding mold regions. This separation is in a direction normal to the surfaces of the mold cavities and, in cases where the article is formed with projections or indentations, such parts are separated from the mating parts of the mold without injury.

Moreover, the indentations or projections of the article, once having been withdrawn from the mating parts of the mold, are prevented from again nesting with them. This action is due to the rotation given to the article by the relative translational movement of the mold members which causes the diameter of cramping to progress about the article, as will be more fully set forth in the appended description.

In both cases, supra, circular translational movement is obtained by means of a power driven crank or eccentric which carries a second crank or eccentric, the latter being pivotally secured to one of the mold members. Normally, the second crank is so carried by the first that their eccentricities cancel and the pivotal connection to the mold member is therefore in alignment with the power driven shaft and remains unmoving as the shaft revolves. Means are provided, however, for changing the position of the second crank on the first crank with the result that the pivotal connection to the mold member is moved a given distance outwardly from its original position. Continued rotation of the power driven shaft thus causes the pivotal connection to move in a circular path, with the given distance as a radius, about the original position. Two or more of such double crank units are provided, each having a pivotal connection with the mold member. The latter is thus given a circular translational movement, each point of it describing a circle about its original position. When the pairs of cranks are subsequently brought back into alignment, the translational movement ceases and the mold member remains fixed in mating relationship with the coacting mold member.

In the method and apparatus described in the above-mentioned Letters Patent the second crank was shifted through 180 degrees on the first crank, whereby the radius of the circular path described by the mold connection was always equal to the sum of the eccentricities. Where interchangeable molds are used, however, requiring the stripping operation to be performed upon articles of different sizes, it becomes necessary to alter the amount of relative movement of the two mold members. That is, the radius of the circular translation used in connection with large articles should be greater than that used with small articles, whereby the proper separation from the mold is effected.

The present invention has for an object the provision of a method and apparatus by means of which varying degrees of relative motion of the two mold members may be produced.

It is usual in the art to provide dowel pins or other coacting means on the two mold halves to assure accurate registration of the cavities. Prior to a translational movement in the plane of the meeting faces of the mold members, therefore, the latter must be separated in a direction normal to the meeting faces sufficiently to allow the registering means to clear each other. This separation serves also to place tension on the molded articles, tending to urge them from the mold cavities. It is desirable to increase the amount of this initial separation for the larger sizes of articles, and I provide settable means for the preselection of the desired separation.

A further object of the present invention is to provide automatic means whereby the radius of the circular translation, which occurs after the settable initial separation of the mold members, is determined by the amount of such separation. By such means I can easily and quickly condition the machine for operation with different mold members on different sizes of articles.

The manner in which I accomplish these and other objects will be made apparent by the following description and claims and the appended drawings.

In the drawings, I have illustrated an embodiment of my invention in the form of a vulcanizing press for rubber balls. The main frame 10 is provided with a flat upper surface 11 for the slidable support of a plate or carrier 12 to which the lower mold section 13 is removably secured. The slidable support for the mold section allows the latter to be shifted in its own plane by means of mechanism later to be described.

The upper mold section 14 is removably attached to a swinging head 15 pivotally mounted on a pair of trunnions 16 carried by the frame 10. The head 15 and upper mold are swung to and from the lower mold by means of a crank motion. Large bull gears 17 at either side of the machine are provided with crank pins 18. The gears are carried on a cross shaft 19 and are oscillated through approximately a half revolution by pinions 20 driven by a reversible power unit 21, mounted on the base frame. A pair of arms 22 in the form of flat plates, best seen in Fig. 1, interconnect the crank pins 18 and a trunnion shaft 23 projecting from the swinging head. As viewed in Fig. 1 the parts are in their lowermost position and the mold is fully closed. As the bull gears are rotated, in a clockwise direction from the position shown, the molds are separated and the upper one is swung clear of the lower one to the dotted line position 14'.

The first portion of the movement of the upper mold is in a vertical direction to allow proper disengagement of the dowel pins 25 used for registration of the mold cavities. The vertical portion of the movement is obtained by means of a cam slot 26 in each arm 22 which is in constant engagement with the hinge trunnion 16. The cam slot is so shaped that, as the crank pin 18 begins its arcuate travel, the arm 22 is so guided that the trunnion 23 follows a vertical path. Vertical movement at the hinge trunnion 16 is enabled by a slotted connection 28 with the swinging head.

In the operation of the machine, after the articles, such as the balls B, have been vulcanized, the molds are separated a small distance and then a stripping operation is performed, which completely frees the balls from any adherence to the mold surfaces, and then the separation of the molds is resumed until the upper mold is swung completely clear and the articles can be conveniently lifted from the lower mold upon which they are then lying.

The stripping action just referred to is obtained by means of power mechanism carried by the main frame. In principle, this mechanism comprises a pair of cranks, one of them drivingly carried on the frame and, in turn, carrying the other. The crank arms are of equal length so that, when the two are folded back upon themselves, the crank pin of the second crank is in direct alignment with the shaft of the first crank. This crank pin is pivoted in the carrier of the lower mold and hence, as the first crank is rotated, the mold remains stationary. The relationship of the cranks, however, may be changed and, since the crank pin is then no longer in alignment, it describes a circle about the axis of the shaft, the radius of the circle depending upon the relative unfolding of the cranks. The circular motion thus imparted to the lower mold effects the stripping of the articles, as will later be described.

Figures 4, 5:
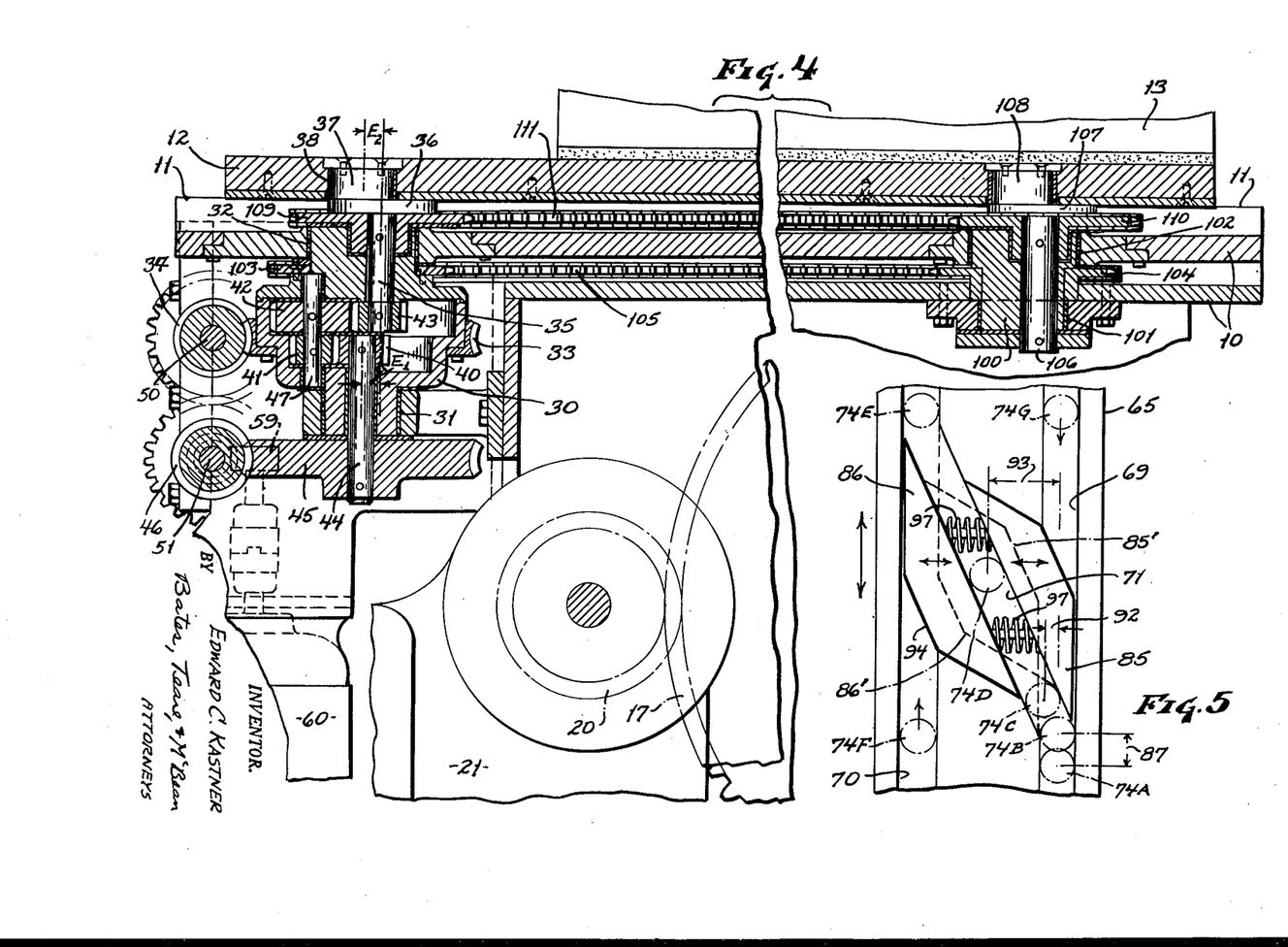
Fig. 4 is a longitudinal vertical section taken on the plane 4—4 of Fig. 2.
Fig. 5 is a developed view of the cylindrical surface of the cam of Fig. 3.
Figure 6:
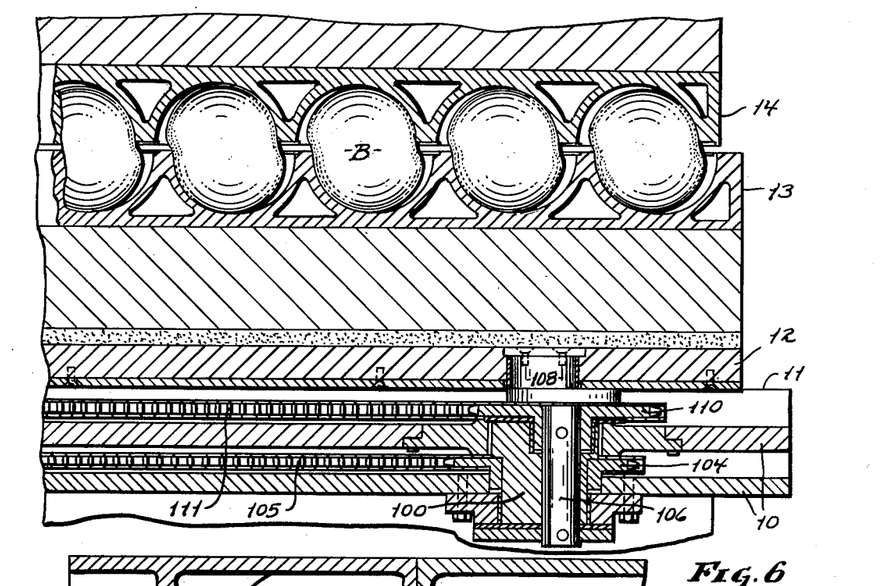
Fig. 6 is a view similar to a portion of Fig. 4 but extended to include the mold members.

In the present embodiment the first crank takes the form of a housing 30, best seen in Fig. 4, which is rotatable in bearings 31 and 32 carried by the frame 10. The housing is provided with a worm wheel 33 and may thus be rotated by a worm 34. A crank pin 35 is eccentrically carried by the housing, the crank arm or eccentricity being indicated by the dimension $E_1$. The crank pin is in the form of a shaft carried in bearings in the housing and, in turn, drivingly carries the second crank 36 having an enlarged crank pin 37. The mold carrier 12 is provided with an anti-friction bearing 38 which surrounds the crank pin, the carrier, therefore, being positionable by the pin. The crank arm or eccentricity of the latter is indicated at $E_2$. Since $E_2$ is equal to $E_1$, it will be seen that, in the position of Fig. 4, the crank pin 37 lies on the axis of the housing 30.

The crank 36 may be revolved relative to the housing by means of a train of gears 40, 41, 42 and 43. The gear 40 is drivingly secured to a shaft 44 rotatably carried at the axis of the housing and carrying a worm wheel 45 rotated by a worm 46. The gears 41 and 42 are drivingly secured to a counter-shaft 47 having bearings within the housing, while the gear 43 is drivingly secured to the crank pin 35.

Figures 2, 3:
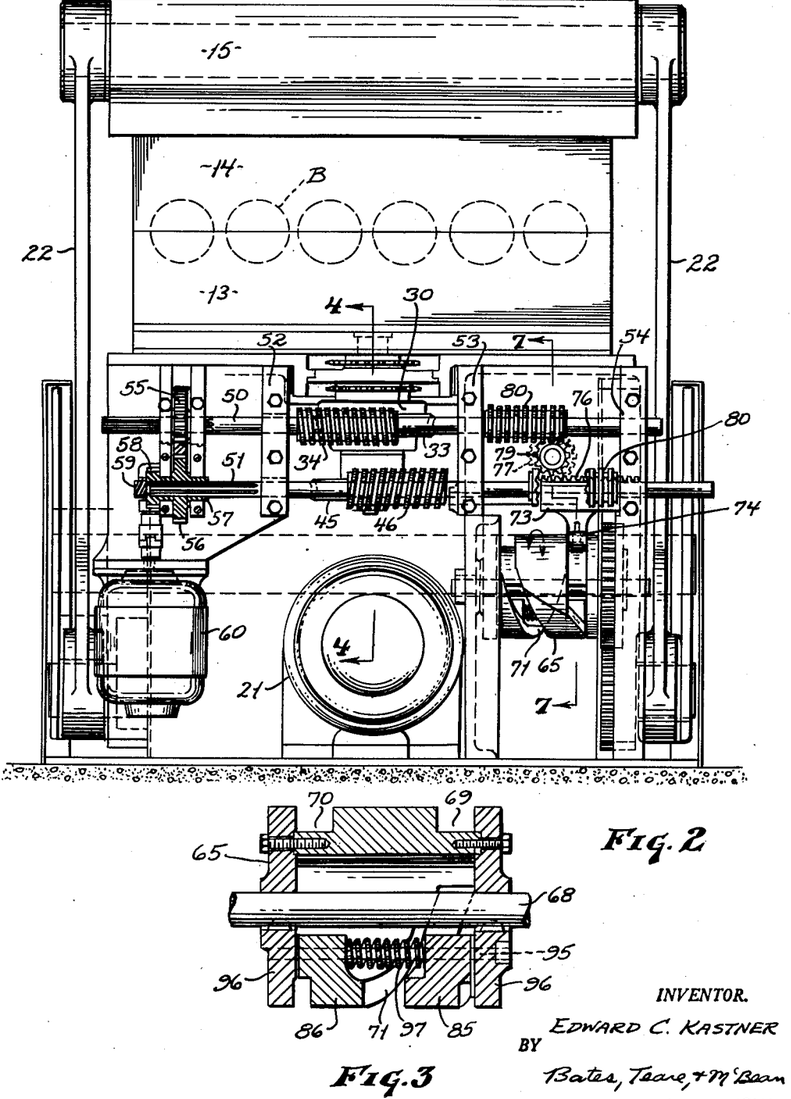
Fig. 2 is a rear elevational view of the machine.
Fig. 3 is a longitudinal sectional view of a drum cam illustrated in Fig. 2.

Normally, the worms 34 and 46 are driven at equal speeds during the opening and closing of the mold. Since the shaft 44 turns at the same rate as the housing, no relative motion of the gears takes place and the entire assembly revolves as a unit. As best seen in Fig. 2, the worms 34 and 46 are drivingly carried by elongated shafts, 50 and 51 respectively, which are longitudinally slidable in bearings 52, 53 and 54 on the main frame. A pair of equal gears 55 and 56 are splined onto the respective shafts, the gear 56 being carried by a sleeve 57 which also carries a spiral gear 58. The gear 58 is driven through a spiral gear 59 by means of a motor 60.

To effect relative motion of the two cranks, that is, to revolve the crank pin 35 within the housing 30 and thus to throw the crank pin 37 from alignment with the housing, means are provided to cause relative turning of the two worm wheels 33 and 45. This relative turning is obtained by a differential sliding of the shafts 50 and 51 and may thus be superimposed upon the equal turning caused by the rotation of the shafts. Although one only of the worms need be slid to effect the desired result, I prefer to use the symmetrical arrangement shown which doubles the action.

Figure 7:
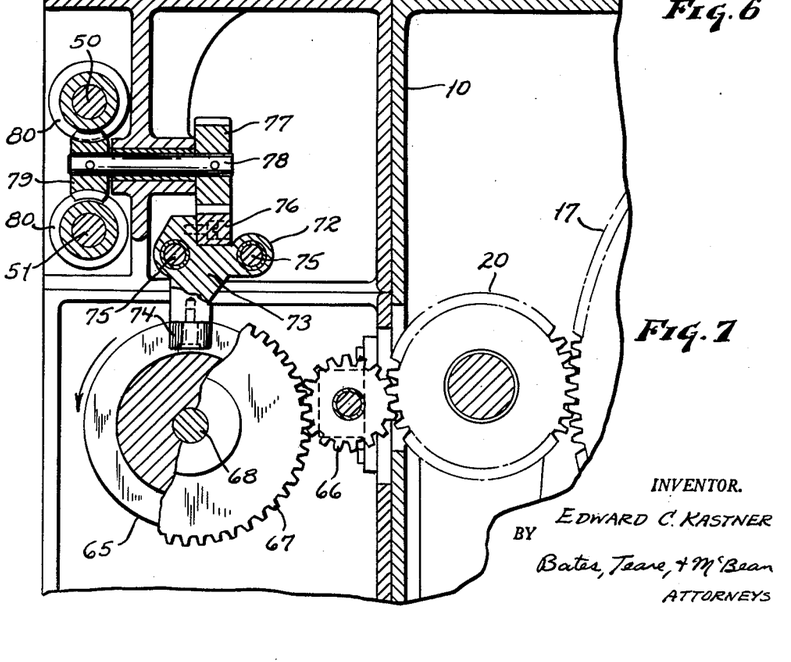
Fig. 7 is a vertical section taken on the offset plane 7—7 of Fig. 2.
Figure 8:
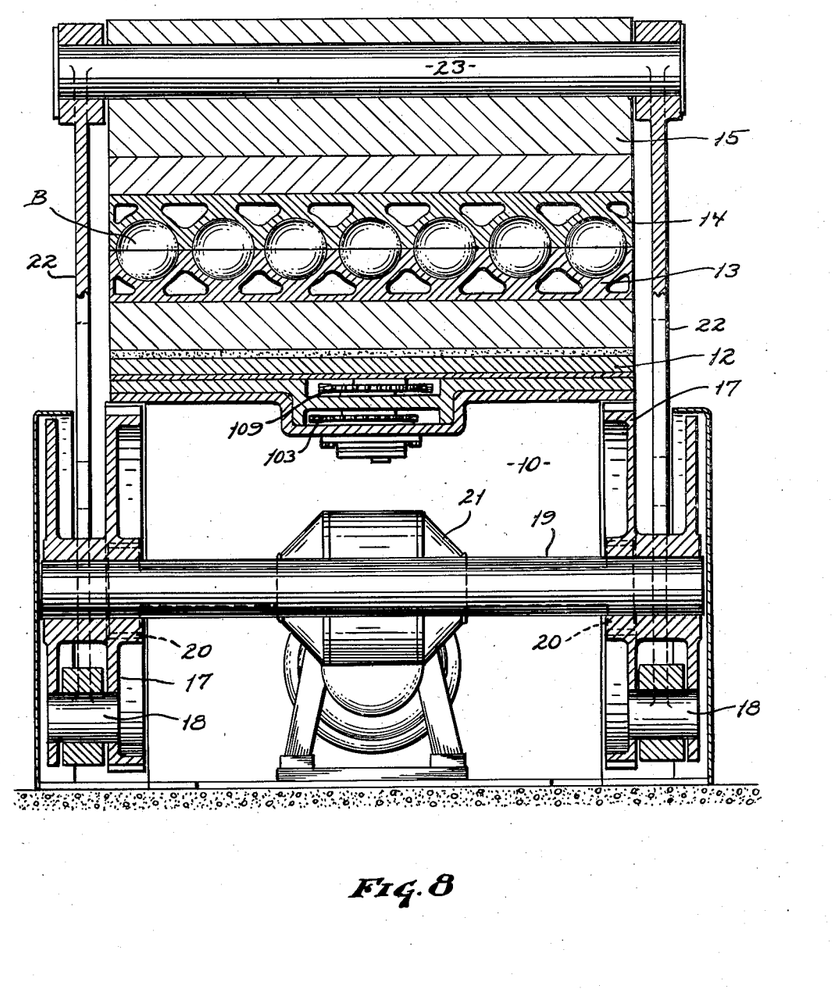
Fig. 8 is a vertical transverse section taken on the plane 8—8 of Fig. 1.

The lengthwise positions of the worm shafts 50 and 51 are determined by the angular position of a barrel cam 65 which is rotated by the mold opening and closing mechanism. As best seen in Fig. 7, the pinion 20 which drives one of the bull gears 17 also, through an idler 66, drives a gear 67 on the drum shaft 68. The angular position of the drum is thus definitely determined for any given position of the bull gear. The drum is provided with two circumferential grooves 69 and 70 with a spiral cross-over groove 71 between them. A cam follower 72 is provided in the form of a block 73, having a depending roller 74 for coaction with the cam groove, and slidable lengthwise of the cam on a pair of supporting rods 75. The block carries a rack bar 76 which meshes with a gear 77 on a spindle 78 journaled in the main frame 10. The spindle 78 drivingly carries a gear 79 which meshes with a series of circumferential grooves and ribs 80 on each of the worm shafts 50 and 51. The gear 79 is thus adapted to position the shafts lengthwise in their bearings, that is, when the gear is held from turning by reason of the engagement of the cam follower 74 with one of the circumferential grooves of the drum, the ribs 80 revolve idly in the tooth spaces of the gear and the worm shafts are retained in their longitudinal position. Whenever the cam follower, however, moves lengthwise of the drum due to the cross-over groove 71, the gear 79 is rotated, through the intermediacy of the rack 76, and the shafts 50 and 51 are slid lengthwise in opposite directions and by equal amounts.

Referring to Fig. 5, where I have shown a developed plan of the drum surface, it will be seen that the proper action of the roller in the groove may be assured by the provision of two movable frogs 85 and 86 which are slidable lengthwise of the drum and are resiliently urged to the position shown. While the press is closed during the vulcanizing operation the position of the drum 65, as determined by the limit position of the bull gear, is such that the cam follower roller stands at the position 74A in the groove 69. As long as the roller remains in this groove, the crank shifting mechanism previously described maintains the cranks in their aligning position and the lower mold member remains unmoving. Any travel of the roller 74 to the left, however, as viewed in Fig. 5, operates to change the relative position of the worm shafts 50 and 51, and hence of the crank pin 37 and housing 30, to a corresponding degree. The extreme position is obtained when the roller moves into the left hand groove 70 and the parts may be so designed that at this time the crank 36 has been turned through 180 degrees on the housing 30, whereby the largest possible radius for circular translation is obtained, namely, a radius of $E_1$ plus $E_2$.

Referring again to the starting position 74A of the roller, it will be seen that the drum may rotate through a small angle, indicated by the distance 87, which places the drum and roller in the relative position of 74B without a lateral shifting of the roller. Thus, at the start of the opening operation, the lower mold member remains unmoving while the upper member rises vertically to clear the cylindrical portion of the dowel pins 25. Thereafter, as the bull gear continues to rotate to further separate the mold, the drum rotation also continues and the roller is shifted to the left by reason of the cross-over groove 71. This groove is defined in part by the inner edge of the frog 85 which normally stands across the groove 69 as shown.

The rotation of the bull gear continues until the molds have been separated by a predetermined distance depending upon the size of the molded articles. The power drive to the bull gear is then temporarily interrupted. This interruption may conveniently be effected by means of a limit switch 90, illustrated in Fig. 1, which is engaged by a dog 91 after a predetermined amount of angular movement of the bull gear. The switch 90 comprises a time delay device of any well known type which, after a suitable interval in which the stripping operation may take place, again energizes the power drive to the bull gear whereby the latter may continue the opening of the mold. It will be understood that other limit switches may be employed to determine the initial and final positions of the bull gear for the closed and open positions of the mold respectively.

When the bull gear is stopped by the switch 90, the cam drum 65 is also stopped and the amount of shifting of the cam follower, and hence the radius of the translational shifting, is automatically determined by the pre-selection of the mold separation. At this time the roller in Fig. 5 stands at some such position as is shown at 74C, after shifting a distance 92 to effect a small radius of circular translation suitable for the stripping of small articles, or at a position such as 74D where it has shifted a distance 93 to effect a larger radius suitable for larger articles. The drum at this time is temporarily stationary and the circular translation continues at the selected radius.

The time delay is sufficient to allow proper stripping of the articles and thereafter the opening is resumed. The cam drum 65 now revolves and the roller is urged into the left hand groove 70 as indicated at 74E. Since the diameter of the drum gear 67 is much less than that of the bull gear 17, more than a complete revolution of the drum occurs as the press opens. The roller thus approaches the frog 86 from the opposite side, as indicated at 74F, and, in engaging the beveled edge 94, forces the frog inwardly to the broken line position 86'. When the roller is completely past the frog the latter snaps back to the full line position. This action is repeated as often as the cam revolves until the press is fully open.

When the press is subsequently closed, the bull gear and cam drum 65 are revolved in their respective opposite directions. The first engagement of the roller 74 with the frog 86 then sends it across the cam into the groove 69, bringing the double crank assembly back into alignment and the lower mold back into proper registering position relative to the approaching upper mold. As the cam continues to revolve the roller meets it from the direction indicated at 74G and forces it aside, temporarily, to the dotted line position at 85'. When the press is fully closed the cam rotation ceases and the roller stands at its original position 74A.

I have illustrated in Fig. 3 a possible design for the drum cam 65. As shown in Figs. 3 and 5 the frogs 85 and 86 may be slidably mounted on the pair of rods 95 extending between side plates 96. Compression springs 97 may be interposed between the frogs, urging them outwardly against the side plates but allowing them to move inwardly to accommodate the passing roller.

As previously mentioned two or more of the double crank assemblies are necessary to cause the proper tranlational movemtnt of the mold carrier. Two of such units are incorporated in the present embodiment. As best seen in Fig. 4, an eccentric sleeve 100 is mounted in bearings 101, 102 in the frame 10. Equal sprocket wheels 103 and 104 are mounted on the housing 30 and the sleeve 100 respectively and are interconnected by a chain 105. A shaft 106 is mounted in the sleeve 100 and carries a crank 107 having a crank pin 108 rotatable in the mold carrier 12. Equal sprockets 109 and 110 are mounted on the cranks 36 and 106 respectively and are interconnected by a chain 111. The eccentricities of the second unit are identical with those of the first and, as the parts are revolved in unison by means of the sprockets and chains, the motions of the crank pin 108 are identical with those of crank pin 37 and the motion of the lower mold member is purely translational.

Figure 10:
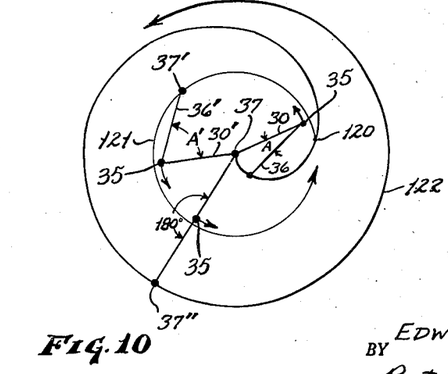
Fig. 10 is a motion diagram of the translational movement.

The actual path followed by the crank pin 37 during the operation of the press is illustrated in the diagram of Fig. 10. The crank pin normally rotates idly at the center point 37 and continues to do so until the press has opened the small amount necessary to clear the cylindrical portion of the dowel pins 25. The crank shifting mechanism then begins to operate and the crank 36 is shifted through an increasing angle A, causing the point 37 to move outwardly. Since the housing 30 is revolving in the meanwhile, the pin 37 describes a spiral path of increasing radius. When the press is subsequently stopped by the limit switch 90 the pin has reached a point, such as that at 120, in its spiral. At this time an angle A' has been obtained between the two cranks. Inasmuch as this angle now remains constant it is illustrated, to avoid confusion of the drawing, at a subsequent position of the two cranks indicated by 30'—36'. As the housing then continues to revolve, the pin 37' leaves the point 120 and describes a circle 121 about its original position as a center. It continues to so revolve until the expiration of the delay period, at which time the upper mold resumes its upward travel and the crank shifting mechanism resumes its action. At its then present position on the circle 121 the crank pin 37 resumes its spiral path. The special case is illustrated in Fig. 10 in which the spiral is resumed at the point 120, in order to illustrate the spiral as an entirety. The radius of the path is increased until the crank shifting mechanism reaches its extreme position, at which time the two cranks stand at 180 degrees and the crank pin, as at 37'', revolves in its outermost circular path 122.

Figure 1:
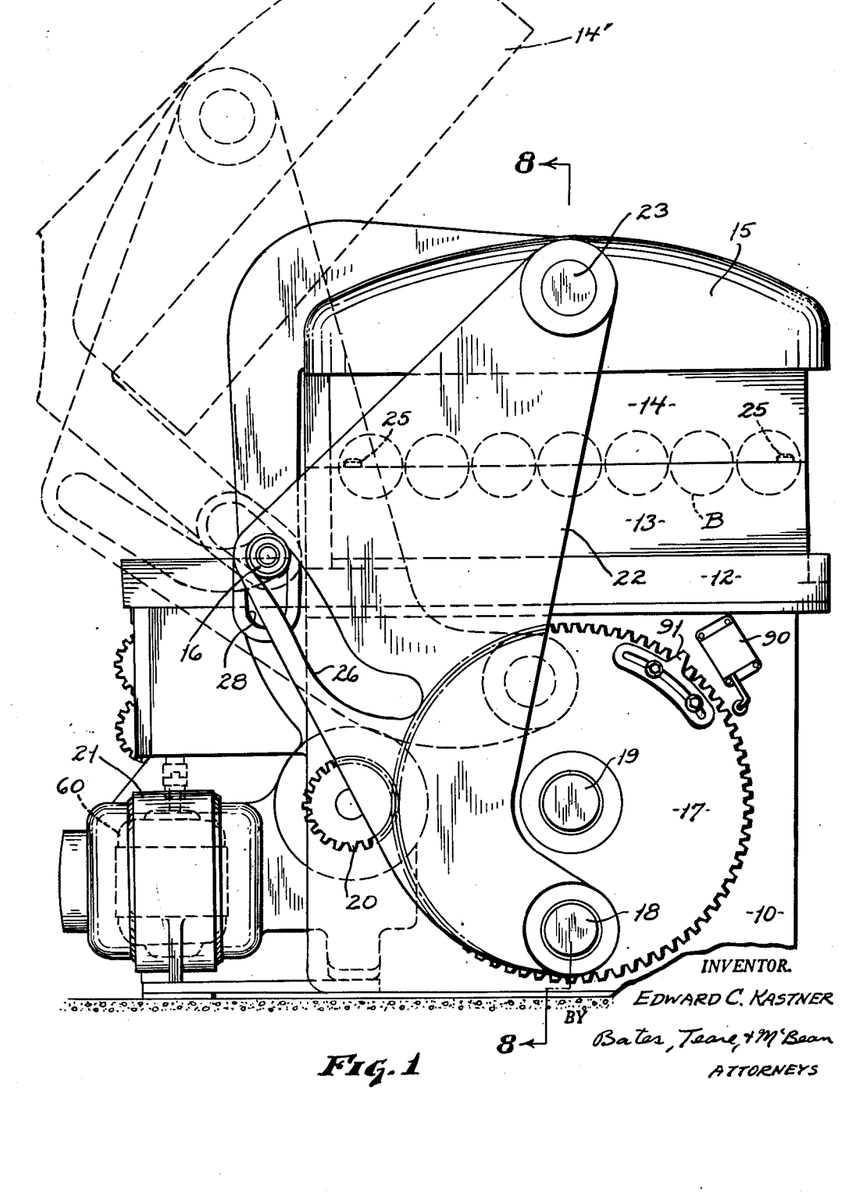
Fig. 1 is a side elevational view of a molding machine embodying my invention.

It will be noted that the time delay can be interposed at any selected time after the start of the opening operation, as determined by the position of the dog 91 relative to the switch 90 in Fig. 1, and hence that the circle 121 may be of any intermediate size depending upon the position of the pin 37 in its spiral travel at the start of the delay period.

Figure 9:
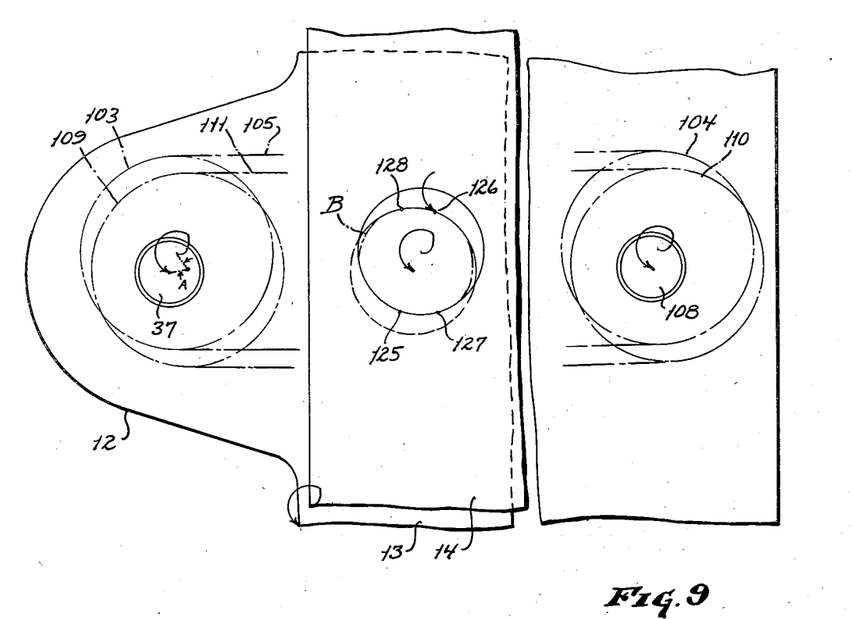
Fig. 9 is a diagrammatic plan view of the upper and lower mold members illustrating the stripping action caused by the translational movement.

Referring now to the stripping operation itself and to Fig. 9, which is a simplified showing of the lower and upper molds and of the driving mechanism for the former, it will be seen that, while the upper mold remains fixed in position, every point of the lower mold describes a path about its original position. One double mold cavity only is illustrated, the ball B within it being shown in broken lines. As the molds are relatively shifted, the ball is cramped between a portion 125 of the upper mold and a diametrically opposite portion 126 of the lower mold, thus forcing the ball away from the remaining portions of the molds. As the shifting of the lower mold progresses along the circular path the diameter of this cramping is rotated, in effect, so that all portions of the ball are eventually loosened from the mold.

A further effect of the circular shifting of the mold is to be noted. The point 126 of the lower mold, which is in firmest contact with the ball, is, in the position of Fig. 9, moved toward the right as indicated by the arrow at that point. The contacting region of the ball is thus also urged toward the right. As the shifting continues the diameter of cramping occurs at the points 127 and 128, the latter becoming the point of firmest contact and therefore, as that point is also moving to the right, the ball is urged in the same direction as before. The additive effect of the circular movement of all the points on the circumference of the mold cavity thus causes the ball actually to rotate within the mold on its own axis and in a clockwise direction where the circular translational movement is in a counterclockwise direction. Thus if there has been a pattern molded into the surface of the ball, the projecting parts of the ball are caused to leave the respective recesses of the mold and are not permitted to become again enlodged therein so that the freeing of the ball from both of the molds is ensured.

The degree of cramping, as defined by the radius of circular translation, is to be chosen with regard to the diameter of the ball, automobile tire, or other article to be stripped from the mold. Larger articles require a greater degree of cramping to release them from the molds and, at the same time, can tolerate such greater cramping without injury. In a particular machine good results have been obtained, when operating upon two-inch balls, by vertically separating the molds one sixteenth of an inch to clear the dowels, at which point the crank shifting mechanism comes into operation, and then stopping the mold separation at one quarter of an inch. At this time the radius of circular translation has become one quarter of an inch and two or three gyrations at this radius serve to free the balls. The upper mold then rises and the radius of translation increases to its outer limit of one and one-half inches. As the upper mold rises, but while it is still in contact with the ball, the increasing radius of the translation causes the balls to roll in widening circles up and over the rim of the lower cavities.

When fitted with molds for five-inch balls, the same machine is set to open to a three-quarter inch separation and the crank shifting, which again starts after the first one sixteenth inch of separation, progresses until a radius of thirteen sixteenths of an inch is obtained for the circular translation. The final radius, after separation is resumed, is, of course, one and one-half inches as before.

While I have illustrated a specific embodiment of my invention, I do not wish to be limited thereby as numerous changes and modifications may be made within the spirit and scope of my invention.

I claim:

1. The method of stripping an article from separable molds comprising, separating the molds by an amount dependent upon the size of the article, producing a translational movement of one of the molds while the molds are so separating such that every point thereof moves outwardly from its original position along a spiral path, stopping the spiral translation at a radius dependent upon the separation of the molds and producing a circular translation whereby every point describes a circle about its original position at the said radius, thereafter increasing the separation of the molds to open position, and simultaneously causing each point of the translated mold to spiral outwardly from its said circle.

2. An apparatus for stripping articles from cooperating molds comprising, means for separating the molds, settable means for stopping the separation at a predetermined distance, means for moving one of the molds in circular translation parallel to the mold meeting surfaces after the separation has stopped, means for enlarging from zero the radius of the circular translation, said last-named means being operatively connected to the first-named means whereby stopping of the mold separation also stops the radius enlargement.

3. An apparatus for stripping articles from cooperating molds comprising, means for separating the molds in a direction normal to their meeting surfaces, settable means to stop the separation temporarily at a predetermined value less than the height of the articles, a laterally slidable support for one of the molds, a rotatable member, an eccentrically journaled crank having a pin eccentrically journalled in said slidable support, the eccentricities of the crank and of the pin, being equal whereby the crank pin may be axially aligned with the member, a pair of power drives to rotate the member and the crank at equal speeds, at least one of said power drives comprising a worm driving a worm wheel, means for sliding the worm longitudinally of its axis to thereby introduce a speed differential in the two drives and to change thereby the throw of the crank and the amplitude of motion of the slidable mold, means operatively connecting the worm sliding means with the mold separating means whereby the change of amplitude is interrupted when the mold separation is interrupted and the amount of the amplitude is determined by the settable amount of the separation.

4. In an apparatus for stripping articles from separable molds, a slidable support for one of the molds, a rotatable member, a crank eccentrically journalled on the member and coacting with the slidable mold, a pair of power drives adapted to rotate the member with respect to the crank whereby a circular translational movement is imparted to the slidable mold, at least one of said power drives comprising a worm driving a worm wheel, the worm being longitudinally slidable while rotating, a cam, a cam follower adapted to longitudinally position the worm and thereby to position the crank relative to the member, and means to position the cam and thereby to change the radius of the circular translation.

5. In an apparatus for stripping articles from separable molds, a slidable support for one of the molds, a rotatable member, a crank eccentrically journalled on the member and coacting with the slidable mold, a pair of power drives adapted to rotate the member with respect to the crank, each of said power drives comprising a worm driving a worm wheel, means for sliding one worm longitudinally relative to the other to modify the rotation of the worm wheel and thereby to change the throw of the crank and the radius of the circular translation, said means comprising a cam, a cam follower adapted to move the worm longitudinally, means on the cam adapted to position the crank concentric with the member to maintain the radius of translation at zero, other means on the cam adapted to position the crank outwardly of the member and thereby to maintain the said radius at a maximum, and settable means to move the cam and to stop it when the cam follower is at a predetermined position between said two means on the cam to thereby predetermine the said radius, at an intermediate value between zero and said maximum.

6. In an apparatus for stripping formed articles from cavitary molds, a pair of mold members one of which is slidable in its own plane, a frame, a member rotatably mounted in the frame, a crank comprising a shaft, an arm, and an eccentric pin, said shaft being eccentrically journaled in said member, and said pin coacting with the slidable mold, the eccentricity of said crank shaft being equal to the eccentricity of said crank pin, means for rotating the member and means for rotating the crank with respect to the member, at least one of said means comprising a worm driving a worm wheel, means for moving the worm longitudinally on its axis to change thereby the relative position of the crank on the member, and means to adjust the amount of longitudinal movement of the worm and to change thereby the radius of the circular translation.

7. An apparatus for stripping articles from cooperating molds comprising, a frame, one of said molds being slidable on said frame, a power driven member rotatably mounted in the frame, a shaft eccentrically journaled in the member, an eccentric carried by the shaft for coaction with the slidable mold, the shaft being angularly positionable in the member to place the eccentric in axial alignment with the member and to move it to various distances from alignment, means for changing the angular position of the shaft relative to the member, means for separating the molds, and means for stopping both the separating means and the changing means whereby the rotation of the member may impart a circular translation of a predetermined amplitude to the slidable mold.

8. An apparatus for stripping articles from cooperating molds comprising, means for separating the molds insufficiently to entirely free the articles, stopping means for holding the mold separation at a predetermined distance, means for moving one of the molds in circular translation about its original position and other means for changing the radius of the circular translation, said stopping means also acting to predetermine the amount of change of radius.

9. An apparatus for stripping articles from cooperating molds comprising, means for separating the molds insufficiently to entirely free the articles, temporarily acting stopping means for holding the mold separation at a predetermined distance, means for producing a translational movement of one of the molds to cause each point of the mold to describe, about its original position, a widening spiral path while the molds are separating which path changes to a circular path at a predetermined point in the spiral after the mold separation ceases, said stopping means also determining the point of change.

EDWARD C. KASTNER.

REFERENCES CITED

The following references are of record in the file of this patent:

UNITED STATES PATENTS

| Number | Name | Date |
| --- | --- | --- |
| 2,365,764 | Kastner | Dec. 26, 1944 |